Aug. 5, 1952   H. R. VAN DEVENTER   2,605,557
METHOD OF AND APPARATUS FOR TEACHING DANCING
Filed April 18, 1944   4 Sheets-Sheet 1
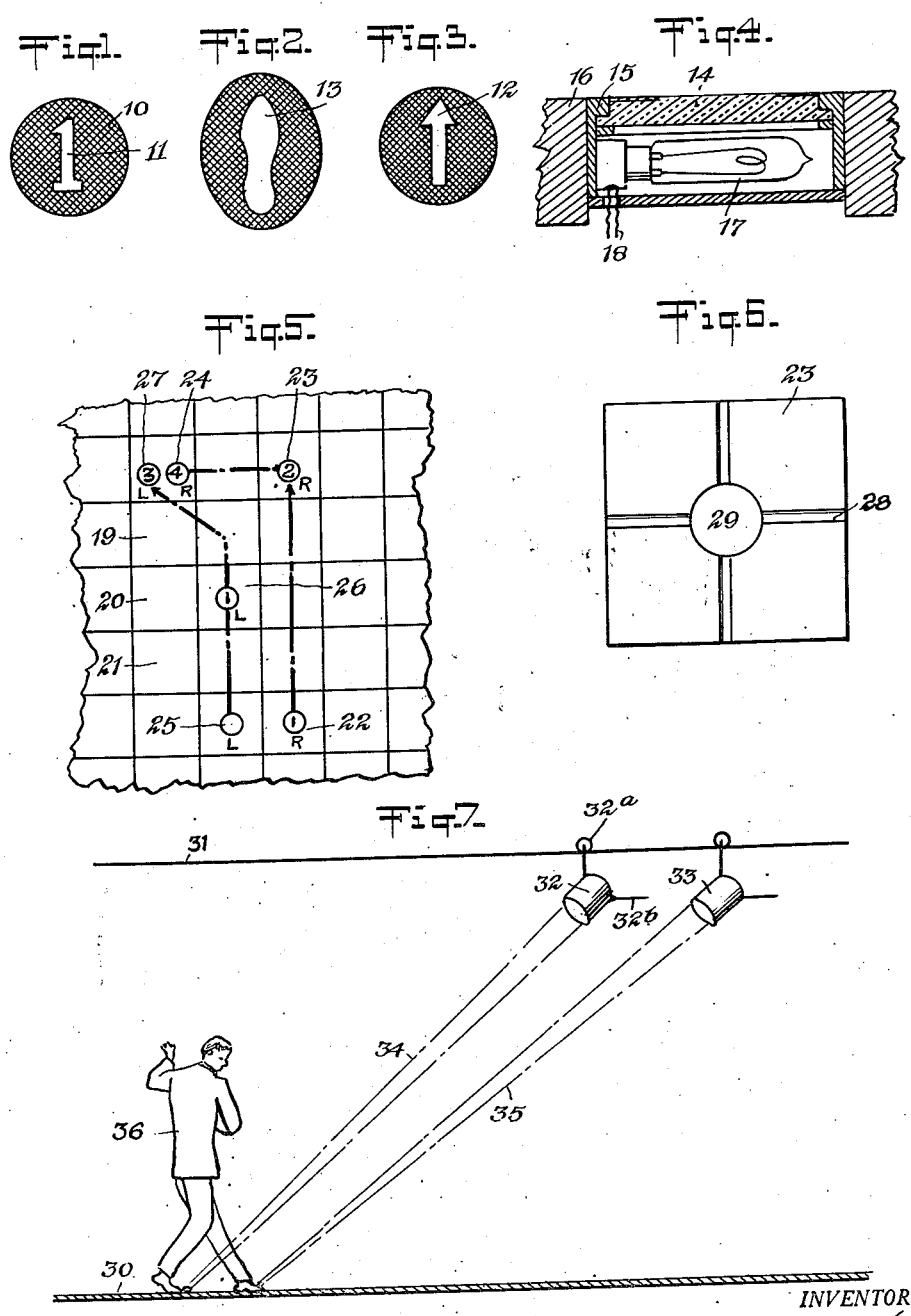
INVENTOR.
Harry R. Van Deventer
BY
Van Deventer & Grier
Attorneys

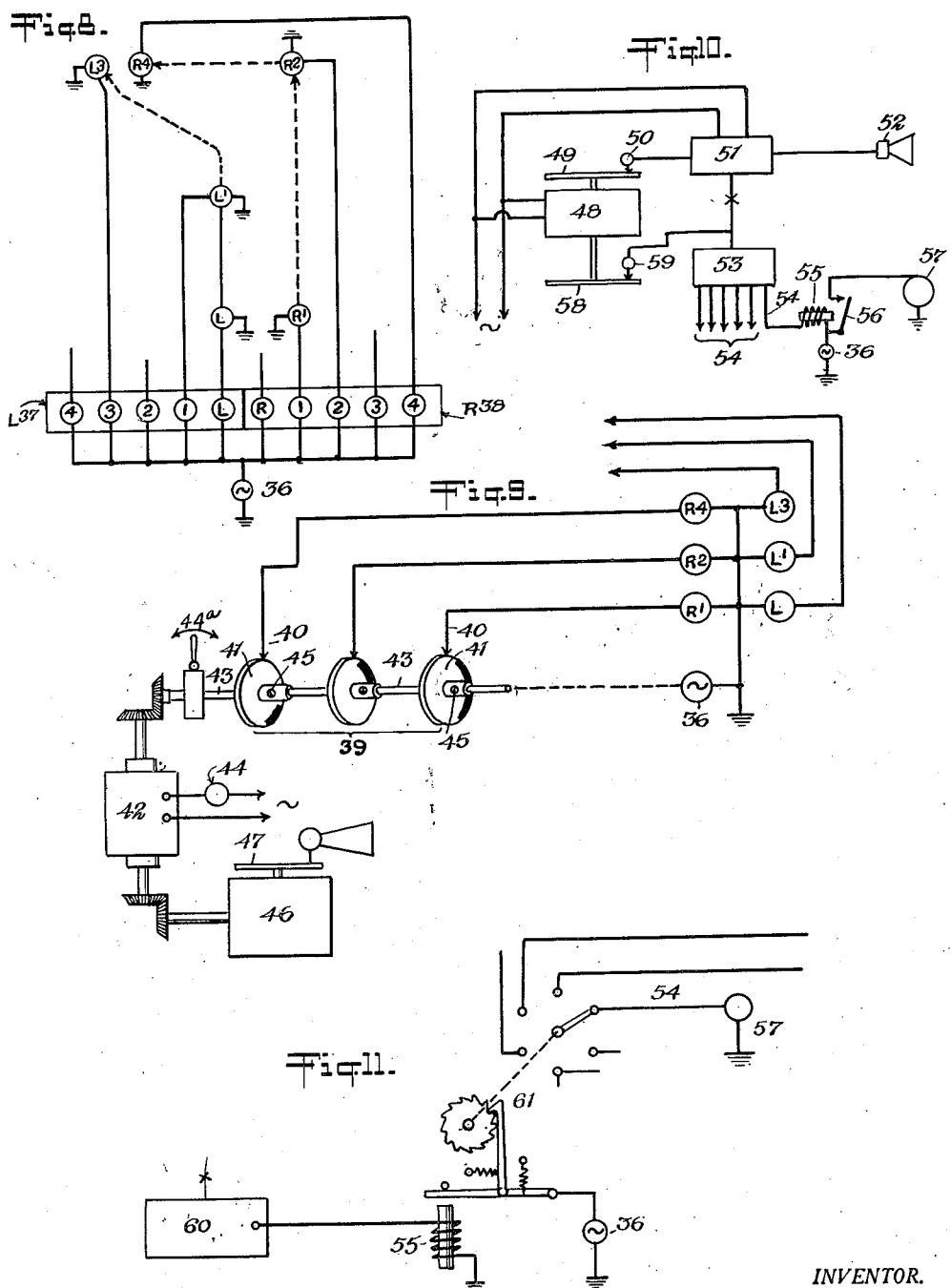

Aug. 5, 1952         H. R. VAN DEVENTER         2,605,557
METHOD OF AND APPARATUS FOR TEACHING DANCING
Filed April 18, 1944                    4 Sheets-Sheet 3
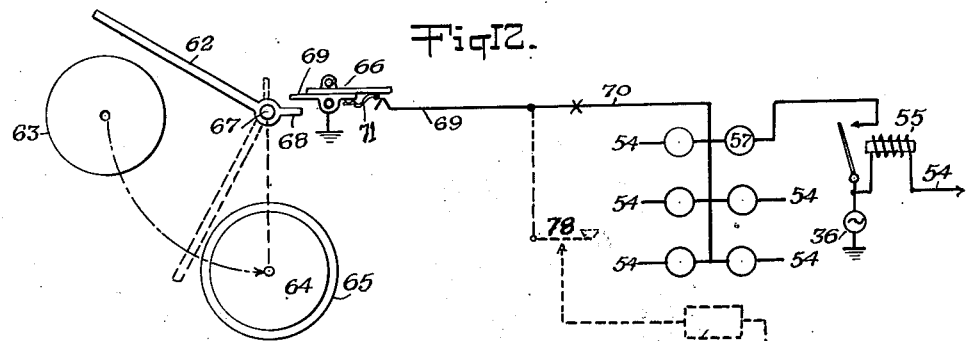
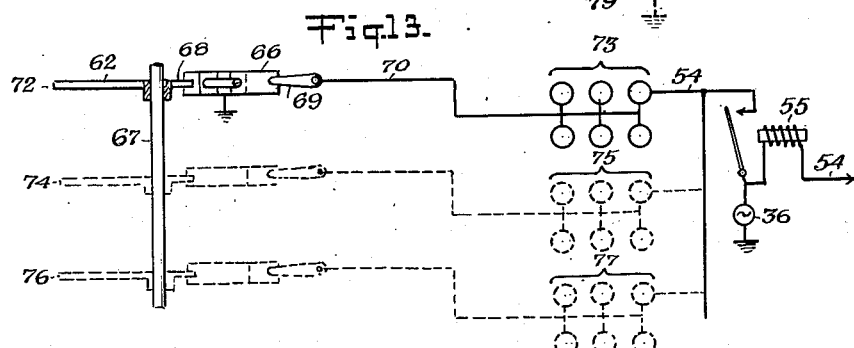
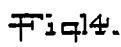
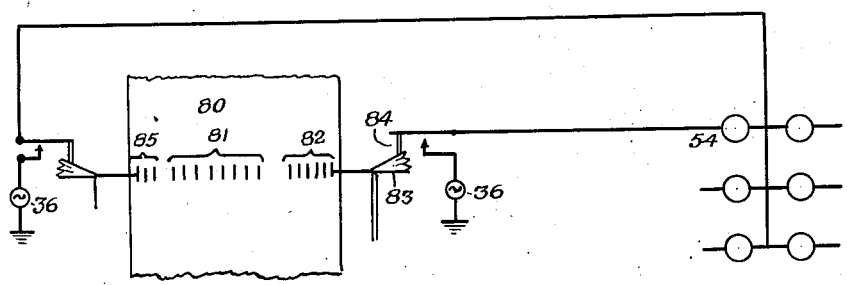
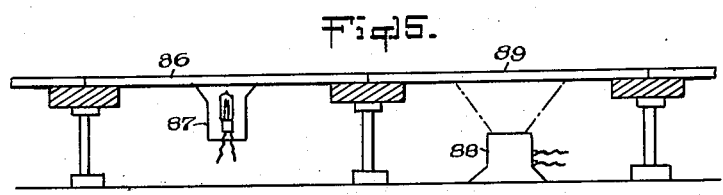
INVENTOR.
Harry R. Van Deventer
BY
Van Deventer & Grier
Attorneys

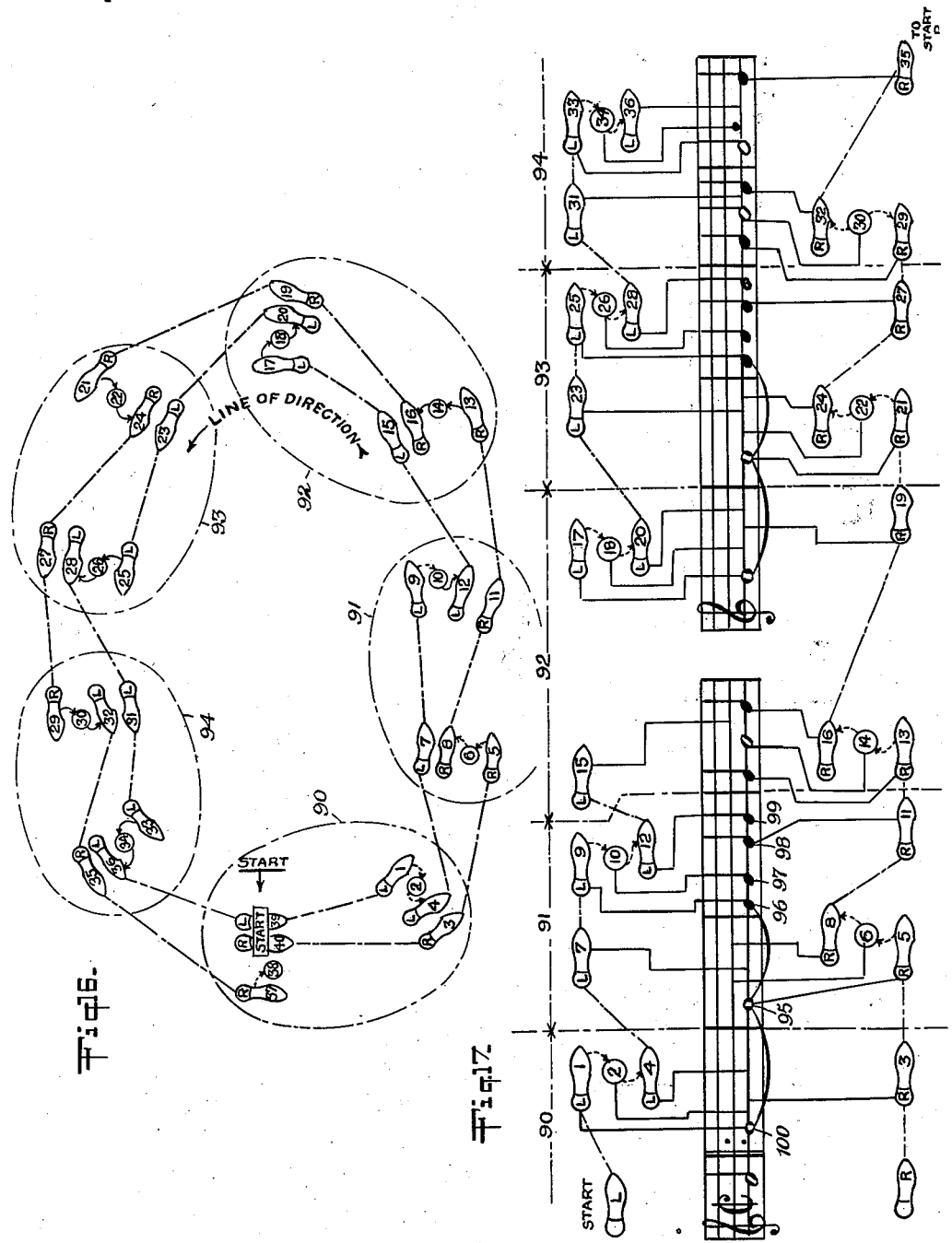

Patented Aug. 5, 1952

2,605,557

UNITED STATES PATENT OFFICE 2,605,557

METHOD OF AND APPARATUS FOR TEACHING DANCING

Harry R. Van Deventer, New York, N. Y.

Application April 18, 1944, Serial No. 531,572

5 Claims. (Cl. 35—29)

This invention relates to a method of and apparatus for teaching dancing, and has for its object an improved method of teaching dancing whereby proficiency can be more easily acquired than by other methods.

Another object is to provide a method that will visually indicate the exact sequence of steps to be taken by the dancer, said indications being preferably given in timed relation to dance music.

Another object is to provide a method that will visually indicate the position of each foot relative to the student's body, or position of advance, as well as the sequence of steps to be taken.

Another object is to provide a method of teaching dancing that is largely automatic, thereby relieving the teacher of considerable effort, the teacher being free to observe the pupils in action without the necessity of calling the steps or leading the pupil.

Pupils can more readily dance in pairs when this method is employed, correcting their mistakes by merely following the repetitious dance pattern as indicated by the apparatus. In many cases a teacher can be dispensed with, the pupil getting all necessary instructions from the apparatus. The apparatus disclosed herein may be used to practice this improved method, but it will be understood that any suitable apparatus may be used, the showing here being merely illustrative, the invention being defined in the annexed claims.

Stated broadly, the inventive concept is to provide visual signals for the feet of the dancer that will indicate the position of the feet at each step, or the steps to be taken, or both. Preferably, these signals may be successively displayed in timed relation to music or some rhythmical sound. In other words, the dance is usually performed with music and each step taken usually bears some timed relation thereto.

The position of the feet may vary step by step. A series of steps with the feet placed in a sequence of positions is commonly called a "dance pattern." Such dance patterns are standardized for certain dances—for example, the waltz, rhumba, tango, et cetera, and these patterns are often printed in books and on large sheets of paper that can be laid on the dance floor so that the student can see the exact steps to be taken and the position of the feet at each step. Such a dance pattern or chart is shown in the patent to Rothkugel, No. 1,277,645, dated September 3, 1918.

Such books and charts do not show the steps in animation, and cannot give the student any visual idea of the length of pause or "dwell" of each step, except by the time notation on the musical score. To understand this requires a knowledge of music which many dance students do not possess.

It is also very difficult, with any still chart or illustration, to depict one step at a time—something easily accomplished with the instant method where the steps may be sequentially and progressively indicated to the student one step at a time, or in any other desired manner either with or without the music.

The method herein disclosed eliminates the difficulties mentioned above and permits the student to learn dancing as it would be taught by a master, without a teacher.

Also disclosed herein, is a new method of writing a music score showing dance steps therewith which, while particularly suited for use with the signal method disclosed herein, is also useful alone as an aid to dancing pupils.

In the accompanying drawings:

Figure 1 is a plan view of the face of an indicant or signal used when practicing the method;

Figure 2 is a plan view of an alternate form of signal;

Figure 3 is a plan view of an alternate form of signal;

Figure 4 is a sectional view of a signal Figure 1, 2 or 3;

Figure 5 is a plan view of a dance floor with signals as shown in the preceding figure;

Figure 6 is an underneath view of one of the signal blocks used in the floor, Figure 5;

Figure 7 is a diagram illustrating the use of projectors to place signals on the dance floor;

Figure 8 is a diagram showing suitable apparatus for practicing the method;

Figure 9 is a diagram showing an alternate form of apparatus for practicing the method;

Figure 10 is a diagram showing still another form of apparatus;

Figure 11 is a diagram showing a form of sequence switch that can be used in the circuit, Figure 10;

Figure 12 is a diagram showing the apparatus necessary to convert a coin-controlled phonograph with record changer, so it can be used to practice the method herein disclosed;

Figure 13 is a diagram of the apparatus, Figure 12;

Figure 14 is a diagram showing the control for the signals operated by a player piano roll;

Figure 15 is a sectional view of a dance floor with the signals arranged below the floor;

Figure 16 is a diagram of a dance floor illustrating the steps of a dance where the dancer encircles the floor and shows a dance pattern of six steps repeated five times; and Figure 17 is a dancing chart showing the dance pattern of Figure 17 and its relation to appropriate music, and discloses a new method of depicting dance steps on a music score.

The indicants or signals may be of any suitable type and may comprise some mechanical device having a shutter, or the like, which when moved will change form or color to give a visual signal. Many such signals are available and usually comprise a semaphore or shutter moved by an electromagnet. Lamps, however, are preferable and these may be arranged as hereinafter described.

Where the signals are projected on to a screen or dance floor, any form of projecting mechanism may be employed, and suitable forms are herein described.

Where the signals are merely for the purpose of indicating the steps to be taken, the signals may have the form shown in Figure 1 where the numeral 10 indicates a circular background.

Such a signal, which is merely a spot of light, may have suitable indicia thereon, as indicated at 11, to indicate the serial numbers of the steps.

Where the signals are to indicate the position of the dancer's feet, then they preferably have the outline of a foot, as shown in Figure 2, or may be of arrow or pointer formation, as shown in Figure 3; the pointed end 12 indicating the toe of the dancer's foot.

Of course, both types of signals may be used in the same dance pattern, or a single signal may indicate both the step to be taken and the foot position.

The foot position is further indicated by pointing the toe-end of the signal in the direction the toe of the dancer should be pointed at the particular step indicated. Obviously various indicia can be used to indicate swinging and turning movements. Once the principle herein disclosed is understood, it is at once apparent that the indicants can be used to give the dancer almost any kind of signal desired.

For example, signals like Figure 2, if displayed progressively as hereafter described, will successively indicate the steps to be taken and, at the same time, will indicate the position of the dancer's feet at each step, the foot-outline 13 being properly placed to indicate the direction of the dancer's toe at that step.

The method may be used by projecting the signals upon a screen, or by arranging them in a dance pattern against a wall or other support where they can be seen. It is preferable, however, to project them on to, or mount them in the dance floor so that the student actually steps upon them when learning the dance.

Figure 4 shows a simple form of mounting for the signals when they are mounted in the dance floor. Any suitable mounting can be used. Such a signal has a glass top 14 which forms the signal, Figures 1, 2 or 3. This top is held in a suitable mounting frame 15 which is a press-fit in a round opening in the floor 16, so that the glass 14 is flush with the upper surface of the floor. A suitable lamp 17 is supported within the casing from which extend the wires 18 supplying the current to the lamp. If desired, a suitable connecting plug or socket may form part of the unit assembly shown in Figure 4.

The glass 14 may be of any suitable size, say 4" to 6" in diameter, or it may be moulded in the shape of a footprint, such as 13, Figure 2, and may be full size of the average foot.

Referring to Figure 5, if desired, the dance floor can be composed of a plurality of blocks or sections 19, 20, 21, et cetera, each one of which may have one or more signals, and these blocks are arranged to form the dance pattern, 22, 23, 24 denoting signals for the right foot and 25, 26, 27 denoting signals for the left foot. The numerals within the signals may denote the order in which the steps are taken.

The blocks may be cross-grooved on the lower surface as shown at 28, Figure 6, to provide grooves to accommodate the wires carrying current to the signals mounted in an opening, or openings 29. The block may be tongued and grooved or secured together to form a floor in any suitable manner, and can be taken up and the blocks carrying signals rearranged in any manner so that any dance pattern can be quickly laid down.

Such a pattern may show some or all of the steps in a given dance. For the purposes of illustration only, six positions are shown but it will be understood that any number may be shown arranged in any desired manner. Various combinations of signals, Figures 1, 2 or 3, may be used and various colors such as green for right foot steps, red for left, may be used to further distinguish or emphasize certain signals, steps or positions.

Figure 7 shows an arrangement where the signals may be applied to any floor without changing the latter in any way. Here, the numeral 30 denotes an ordinary dance floor and 31 a wire or other support on the ceiling of the room. Suspended from 31 are the small projectors 32, 33 adapted to project onto the floor images forming the signals having suitable outlines, Figures 1, 2, or 3, or any other desired outline.

The projectors 32, 33 may be individual for each signal, or each projector may project a number of signals progressively by any means associated with the projector, such as the usual revolving film or slide commonly used in such projectors.

If desired, the projector 32 may be an ordinary motion picture projector having a film to project the complete dance pattern which is animated to show a step at a time. This may be synchronized with a phonograph so the dance pattern will show foot steps and foot positions in timed relation to music, or the picture film may have an accompanying sound track which is timed to the picture showing in the usual manner.

The floor may be whitened to afford a proper background for the signals.

If desired, the projector 32 can be slowly moved so as to always project the dance pattern ahead of the dancer. This can be accomplished by having the support 31 extend parallel to the direction in which the dancer 36 advances and the projector is mounted to slide along the support ahead of the dancer so that the emergent beam 34 from the projector places the next step to be taken just ahead of the dancer.

31 may form a suspension from which the projector hangs on pulley 32ª and is towed along the suspension by cable 32ᵇ.

When separate signals are used in Figure 7 each signal will form a spot of light on the floor, and the emergent beams from the projectors, such as beams 34, 35 are projected at such an angle that they do not encounter the figures of the students at 36, whose movements over the dance pattern as they progress through the dance do not interfere with these beams until the dancers' feet are practically on the signal spots formed thereby.

Apparatus for operating the separate signals will now be described.

Figure 8 is a diagram showing how the signals are wired for manual control, either with or without musical accompaniment.

Here a source of current 36, such as the usual house lighting current, is connected to two banks L37, R38 of push-buttons or switches, one bank for the left and the other for the right foot signals. This arrangement may be operated by: left foot signals by the left hand of the operator, right foot signals by the right hand of the operator.

Each bank of push buttons may have as many individual buttons independently operable as desired for a given dance pattern, but the bank may also be so constructed that when a button is pressed, the circuit controlled thereby is live until another button is pressed, whereupon the first mentioned button is restored to open circuit position. As such banks of interlocking buttons are in common use, they are not described in detail.

To operate the device, Figure 8, the operator merely presses the buttons in banks L37 and R38 as desired to sequentially operate the signals controlled thereby. For example, using the dance pattern shown in the figure, the operator would press the L button in the left bank L37 and the 1 button in right bank R38, thus illuminating the signals in L and $R^1$ position. As the left foot is the first to advance one step, the operator next presses button 1 in L37. This extinguishes the L signal and illuminates signal $L^1$.

The next dance step is that the right foot advances from position $R^1$ to $R^2$ so the operator now pushes button 2 in bank R38. This extinguishes signal $R^1$ and illuminates signal $R^2$.

The next step is that the left foot advances from position $L^1$ to $L^3$, so the operator now pushes button 3 in bank L37. This extinguishes signal $L^1$ and illuminates signal $L^3$. The next and last step in the pattern shown in Figure 8 is that the right foot advances from position $R^2$ to position $R^4$ so the operator now pushes button 4 in bank R38. This extinguishes signal $R^2$ and illuminates signal $R^4$.

As the right and left banks of buttons are independent, any button in either bank can be operated at will and one or more signals in each bank can be simultaneously illuminated, or only one signal of the entire dance pattern need be displayed. The operator can, in effect, operate the device so as to cause the signals to "dance" over the floor from start to finish at any desired speed and in any sequence, thereby showing the student where to place each foot and at what rate to advance, the amount of "hesitation" or "pause" of each step, and the heel-and-toe position of the feet at each step, shown in action.

The method can, therefore, visually indicate timing and rhythm in a manner impossible with "still" diagrams.

The operator of the apparatus, Figure 8, can, if desired, operate the pushbutton controls in timed relation to any appropriate music, thereby indicating successive foot steps to be taken in timed relation to the sound produced, and also indicate the position of the dancer's feet.

In Figure 9 is shown apparatus that is automatic, no operator being necessary. Here, the signals $R^1$, $R^2$, $R^4$—L, $L^1$, $L^3$ are arranged same as the corresponding signals in Figure 8 previously described, and are connected to the commutator or distributor means 39. Each signal is connected to a brush 40. The segments of the commutator, one of which is shown at 41, are so shaped as to make and break contact with the brushes as the commutator revolves, thereby doing automatically what the operator did in connection with the mechanism, Figure 8. Such commutator devices for sequentially controlling electrical devices are well known and therefore are not here described in detail.

The commutator 39 is driven by a motor 42 via gears and shaft 43, or in any other suitable manner. If it is desired to operate the device, Figure 9, in timed relation with appropriate music, the speed of the device can be varied by adjusting the resistance 44 in the motor circuit, or in any other suitable manner. A change-speed device 44$^a$ can be inserted between the driving motor 42 and the driven shaft 43 of the commutator and this can be adjusted until the signals indicate successive foot steps to be taken in timed relation to the music.

The commutator 39 controls the successive operations of the signals, each segment 41 thereof controlling the duration of its associated signal relative to all others. Individual adjustment of each segment relative to all others is possible. A set screw 45 in the hub of each segment permits its adjustment on shaft 43.

Should some mechanical device be used to produce the music—for example, a phonograph 46, it may be connected in any suitable manner to the motor 42 so that the phonograph and the commutator 39 are driven in timed relation, then resistance 44 will control the music tempo and the device 44$^a$ will adjust the signal display relative to said tempo.

The apparatus shown in Figure 9 using a commutator 39 operated in timed relation to any musical instrument such as a phonograph 46 requires a mechanical connection between the two, and requires accurate timing of the music produced by the record 47 and the operation of commutator 39.

If the signals can be operated directly by means imposed on the record 47, more accurate timing is possible, and the record 47 then contains everything necessary to properly control the signals and the time of "dwell" or the length of time each signal is illuminated. This also avoids the individual adjustment of the segments 41.

Figure 10 shows such apparatus. Phonograph records of both the film strip and disc types can be used. Such records may have:

(a) A normal recording of sound and an "operating component" or "peep" combined therewith on the same record so that the record consists in part of recorded vibrations comprising the resultant of the sound and the operating component. These are afterward separated and used as hereinafter described; or (b) A normal recording of sound and an "operating component" or "peep" recorded at intervals in the same groove but spaced apart from the sound recording so as not to form part thereof. These are afterward used separately as hereinafter described; or (c) Two separate records driven in synchronism can be used, the normal sound being recorded on one record and the "operating component" or "peep" on the other. These separate recordings are used separately as hereafter described; or (d) A single record with two grooves or sound tracks thereon, one for the music, the other for the "operating component" or "peep," used same as (c).

In Figure 10, 48 denotes a phonograph having a record 49 of the type (a) or (b) referred to above. This has the usual pickup 50 in engagement with the record and connected to a suitable amplifier 51 to which is connected the loud speaker 52.

The amplifier is connected to a filter 53 adapted to split the "operating component" into as many separate channels as there are signals in the dance pattern. Each channel, such as 54, is connected to a suitable relay 55, the armature 56 of which controls the circuit to one of the signals 57.

As the record 49 revolves, the musical recording is picked up, amplified and reproduced in the usual manner. The musical recordings cannot pass the filter 53, so they do not affect the relays 55 and their associated signals. However, the "operating components" or "peeps" pass into the filter 53, are split up therein and each component operates a relay 55 which in turn closes the circuit through its associated signal, such as 57.

As the timing and duration of the "operating components" or "peeps" are determined when the record 49 is made and these are properly synchronized with the music, the operation of the apparatus is entirely independent of mechanical devices such as the commutator 39 of Figure 9 and no adjustments are necessary. By merely changing the record and rearranging the signals to suit the dance pattern desired, any dance to music can be demonstrated. Furthermore, the operator cannot alter in any way the sequence or timing of the signals relative to the music, so the original timing and sequence of the record— which can be made by an expert—are always preserved.

When two separate records are used as referred to under (c) above, the record 49 contains the music recording only and a second record 58 carries the "operating components" and is connected to the filter 53 via pickup 59 as shown, the connection between filter 53 and the amplifier being broken at X and if necessary an amplifier being added to the filter 53.

As the two records 49, 58 are in synchronism, the apparatus operates in the same manner as the apparatus first described in connection with this Figure 10.

If one record with separate sound tracks, as described under (d) above, is used, the pickup 50 is in the music groove and the pickup 59 in the operating component or signal control groove. The operation is the same as described for (c) above.

With a dance pattern with six positions, six different operating components are necessary when using the arrangements just described in connection with Figure 10. To simplify the filter 53 and use only one frequency, the arrangement shown in Figure 11 may be used.

In Figure 11 the filter 60 is used as previously described in connection with the preceding descriptions of Figure 10, except that it is arranged to handle a single frequency flowing in the operating circuit including a sequence or stepping switch 61 of any suitable type, which progressively closes the signal circuits including the signals, one of which is shown at 57. The operation is the same as previously described in connection with Figure 10 except the switch must be set at the beginning of each record unless a suitable automatic repeating phonograph mechanism is used. Or the switch may be of the "homing" variety.

When the two record scheme (c) or the double groove scheme (d) herein disclosed is used, the filter 60 may be replaced by an amplifier for the operating frequency, although some filter is desirable to prevent stray frequencies from operating the control device.

No attempt has been made to describe in detail the construction and operation of the phonograph 48, the amplifier 51, filter 53 or, in fact, any of the component parts, the construction and operation of which are well known.

The herein described method makes self-instruction in dancing very easy. The separate or combined music and control records may be prepared by competent musicians and choreographers, and then used by any one who, by merely following the signals, can acquire the desired dance steps. Obviously, no teacher is required, as the records may also contain any verbal instructions necessary.

This method is applicable to coin-controlled phonographs now in common use in restaurants and bars. Such phonographs may be equipped with the commutator device of Figure 9, or the record control device in Figure 10, and the signals arranged over the dance floor as shown in Figure 7. Customers upon dropping a coin in the machine will then receive a dancing lesson, no teacher being required. Thus the invention broadens the usefulness of such existing coin controlled devices and makes it possible to greatly enlarge the study of dancing by the general public using the methods of competent teachers who will prepare the records.

If the apparatus Figure 10 is used with records, as referred to in paragraph (a) or (b) hereof, in a coin controlled phonograph having a plurality of records which may be selected by the user, it is apparent that only one dance (rhumba, tango, waltz, etc.) employing the herein described method could be taught because of the necessity of rearranging the signals for each dance pattern.

Assuming the signals were set for a tango, while the machine might contain several tango records and the user could select and use any one of them, the machine could not be used to teach anything but the tango.

Figure 12 shows diagrammatically how the foregoing limitation is overcome so that a coin controlled phonograph may be equipped to teach a plurality of different dances.

Referring to the figure, the numeral 62 denotes the change-record arm of the phonograph which usually moves first vertically to select one record from the stack or magazine of records shown at 63 and then swings horizontally to move the selected record 64 to the record table 65 of the phonograph which then revolves and the record is played in the usual manner. There are many types of record selectors and the instant invention can be applied to any of them, as it is only necessary to mount a switch, generally denoted by the numeral 66 so it will be operated by the record selector mechanism such as arm 62 when any certain record is selected. This switch controls the signals forming the dance pattern accompanying said certain record, therefore, when a certain record is selected, the mechanism also selects the accompanying set of signals for the dance pattern.

For example, record 64 is a rhumba. When the selector arm 62 transfers this record to the table 65 to be played, said arm moves vertically on the shaft 67, Figure 13, until it is opposite said record reposing in the stack 63. Arm 62 now revolves on shaft 67 to move the record to table 65. During said last movement the stud 68 on the arm engages the member 69 on switch 66 and moves the latter from normal open circuit position, as shown in Figure 12 to closed circuit position, closing contact 69 therein and completing the operating circuit 70 common to all of the signals of the rhumba dance pattern. Only one individual signal circuit is shown in Figure 12, as all are the same and these signals are operated as described in connection with Figure 10.

The selector arm 62, when restoring record 64 to the stack, that is, when the stud 68 is moving clockwise in Figure 10, may pass by switch 66, which the trip-spring 71 permits it to do, or it may hold contact 69 closed while the record is playing and open it when restoring the record to the stack 63.

Referring to Figure 13, the upper position 72 of the arm 62 illustrates that arm in position to handle the rhumba record 64, and the dance pattern 73 is controlled thereby.

At 74 the arm 62 might select a tango record and also select dance pattern 75 complementary thereto.

From the foregoing it will be seen that the phonograph if equipped as described, selects not only the record but the dance pattern that goes with it and therefore the dance floor must have as many signals as necessary to make the dance patterns for all of the dances desired. In the case of three different dances this may be a total of 18 signals, as shown in Figure 13.

It will be understood that the phonograph only has switch 66 associated with certain dance record positions in the stack. The phonograph may therefore play other records from the stack without operating the dance signals.

If it is not desired to make the selection of the dance signals entirely automatic as just described, the switches 66 may be omitted and replaced by manual switches 78, Figure 12, which are operated by the user at the same time as the coin is dropped in the phonograph. Thus the dance pattern can be used or not, as desired.

A coin control 79 may be placed in circuit with the switch 76 for each group of signals, or it can be inserted at X in wire 70 so that payment for the use of the dance signals can be collected separately from the music.

Where existing phonographs are converted as described herein, the projector system of signals as described in connection with Figure 7 is easily installed, especially if a single projector is used for each dance pattern. When this is done for three dances (waltz, tango, rhumba) there would be three projectors, each one of which would project six separate signals on to the dance floor. Each signal would, of course, be separately controlled as herein described. As such multiple projectors are used in the theatre and in planetariums, their construction and operation is well understood and any suitable form may be used. Such projectors are easily hung up and moved about and can readily be installed anywhere.

Once the inventive concept herein disclosed is understood, it is obvious the term "record" used herein may apply to any kind of record besides that for a phonograph—a piano roll for example—having means thereon for operating a dance step indicant. Figure 14 shows diagrammatically how control of the signals or indicants are operated by a piano roll. Here, 80 denotes the usual music roll having the usual perforations 81 for operating any suitable form of piano action. The 6 note perforations 82 on the extreme right or 3 perforations on the extreme left and right (seldom used) are reserved for operating the dance signals, and, as the signal perforations are cut in proper timed relation to the music perforations, proper timing is accomplished. The length of perforations 82 will determine the "dwell" or length of time each signal is displayed.

Each perforation operates the usual player piano bellows mechanism, such as used for operating the piano key action, and this closes contact 84 thereby operating the signal 54 as previously described. Only one signal circuit is shown in Figure 14, as all signal circuits are the same.

The roll 80 may also have perforations such as those at 85 to control the dance pattern signals for different dances, such as waltz, tango, rhumba, et cetera, so that when a roll is put on the piano, the roll automatically selects the desired dance pattern in the same manner as the mechanism described in connection with Figure 13.

Where this method is in constant use, a special floor may be preferable. Figure 15 shows such an arrangement. Here, the numeral 86 denotes a floor of glass or other translucent or transparent material, below which the signals are arranged in various different dance patterns. One of these signals is shown at 87 secured directly to the underside of the floor and supported thereby. Or the signals may be set under the floor as shown at 88 so as to project the desired indicant on to the floor at 89. If desired 88 may be a suitable projector for the entire dance pattern as previously mentioned.

The floor 86 can be in sections so it can be raised upwards to gain access to the signals and wiring. The control mechanism and the musical instrument can be located below the floor with a loud speaker 52 above the floor if one is used, thereby shortening the wiring and connections and conserving space.

A remote control device as in common use for phonographs and player pianos can be conveniently located above the floor so as to be readily accessible to the users and this may contain any control switches necessary for the signals as herein described.

The combining of the control means such as the "peeps" on the phonograph records, or cutting the control slots 85 and 82, Figure 14, on piano rolls in time with the music present no difficulty.

The music is recorded in the usual manner and the choreographer inserts at the proper time by any suitable means, the necessary "peeps" to affect control of the signals. These "peeps" may consist—where the dance pattern has 6 steps—of six different frequencies above audibility, which are used as per paragraph (a) or (b) hereof and which will not interfere with the reproduced music. These "peeps" are of the proper duration to cause the signals to indicate a pause or "dwell" of any step. Coincident with the recording of the "peeps" the choreographer may speak any instructions necessary so that the completed record or records will:

(1) Furnish the student all necessary music;

(2) Furnish complete instructions;
(3) Operate the signals to indicate the steps to be taken and the position of the feet at each step.

By the use of this apparatus the dance student, in effect, has an expert teacher present, and lessons can be repeated until learned.

Figure 16 is a diagram of a dance floor illustrating all the steps taken by a dancer in circling the floor where the dance pattern is repeated five times.

The dance pattern is that of a simple foxtrot basic step—one (slow) step forward, two (quick) steps to side—from R—"start" to R3 and from L—"start" to L1, L1 to L4. The same step forward and back is commonly termed the "Box."

The 6 foot signals in each dance pattern are enclosed in the dotted lines 90, 91, 92, 93 and 94 and are the same in each position.

The numerals shown within the said dotted lines and in the outline (or adjacent the outline) of the signals indicate progressively the foot positions from the "start" position around the floor and back to "start."

Referring to Figure 17, the left foot, on the first beat of the note connected therewith by a vertical line, moves to position 1 and is held the second beat (indicated by the circle signal 2 in pattern 90, Figure 16). Right foot moves on the third beat of the note to position 3. Left foot moves to signal 4 on the fourth beat, and so on throughout the entire series of steps.

The method of scoring the dance steps into the music will now be readily understood. The choreographer being equipped with means for producing six different "peeps" for the steps and rest, are operated in time with the music. For example, when making the dance pattern 91 "peep" 1 would be operated to display signal 5 with the foot beat and the note indicated at 95. At the second beat the "peep" for the hold signal 6 would be operated and this signal displayed to warn the dancer to hold this right foot position 5 for the second beat of note 95 which is the interval between steps 5 and 8. The "peep" for step 7 would be operated to display step 7 on the third beat of note 95. Step 8 would be operated on the fourth beat of note 95. With quarter notes, the feet are moved on the beat with each note, for example, signal 9 with note 96. Hold signal 10 with note 97, signal 11 with note 98 and signal 12 with note 99, thus completing the dance pattern 91.

If a mechanical switching arrangement is used, as shown in Figure 9, then the contact members 41 are arranged to display the dance signals in proper timed relation to the music and the "dwell" or duration of each display is regulated by the shape of the individual members 41.

By "dwell" or "duration" is meant any pause or hesitation step, the signals in circles designating such steps and the dotted lines, Figure 17, denoting the foot movements from signal to signal. The advantage of designating the hesitation steps by separate signals such as the circle signal 2, pattern 90, Figure 16, is that the dancer's foot at L1 in this figure does not cover the "hold" or hesitation signal, but remains at L1 for two beats on the note 100 (Figure 17) and therefore does not move to L4 on the fourth beat of note 100 until after the right foot has moved to R3 on the third beat.

What is claimed is:
1. In combination, a floor, a projector mounted above said floor, means in said projector for projecting indicants for dancing on said floor, and means for operating said projector to cause said indicants to progressively indicate dance steps.
2. The combination as claimed in claim 1 wherein the indicants are displayed in timed relation to music produced by means operated in synchronism with the projector.
3. In combination with a dance floor, means for producing a plurality of signals thereon forming a dance pattern comprising electric light projectors located above said floor and adapted to direct beams of light to said floor to produce said signals thereon, upon which the feet of a dancer can be placed, circuits connecting said projectors with a source of current, and switches in said circuits for selectively operating said projectors to produce said signals.
4. The method of teaching dancing comprising projecting visual indicants in a dance pattern in successive steps progressively onto a floor from a source spaced above the surface of the floor, causing a student to follow the progressively projected indicants and controlling the projection to allow the indicants to intermittently and temporarily remain stationary in their respective positions so that the student may place his feet upon the indicants to learn the successive steps of the dance pattern.
5. The method as recited in claim 4 wherein the controlling of the projection is in accordance with the timed relation to the music for the particular dance pattern.

HARRY R. VAN DEVENTER.

REFERENCES CITED

The following references are of record in the file of this patent:

UNITED STATES PATENTS

| Number | Name | Date |
|---|---|---|
| 897,280 | Forsyth et al. | Sept. 1, 1908 |
| 1,277,645 | Rothkugel | Sept. 3, 1918 |
| 1,342,860 | Mortimer et al. | June 8, 1920 |
| 1,602,499 | Meinecke | Oct. 12, 1926 |
| 1,607,226 | Wood | Nov. 16, 1926 |
| 1,642,810 | Grimaldi | Sept. 20, 1927 |
| 1,688,450 | Corbett | Oct. 23, 1928 |
| 1,690,279 | Craft | Nov. 6, 1928 |
| 1,696,901 | Bostelman, Jr. | Jan. 1, 1929 |
| 1,704,104 | Ruddick | Mar. 5, 1929 |
| 1,723,060 | Neill | Aug. 6, 1929 |
| 1,743,965 | Garrett | Jan. 14, 1930 |
| 1,815,443 | Mitchell | July 21, 1931 |
| 1,916,567 | Grant | July 4, 1933 |
| 1,931,287 | Fisher | Oct. 17, 1933 |
| 1,953,299 | Grant | Apr. 3, 1934 |
| 1,985,253 | Hopkins | Dec. 25, 1934 |
| 2,023,573 | Bury | Dec. 10, 1935 |
| 2,158,475 | Montine | May 16, 1939 |
| 2,221,312 | Jenkins | Nov. 12, 1940 |
| 2,298,988 | Todd | Oct. 13, 1942 |
| 2,402,109 | Williams | June 11, 1946 |

OTHER REFERENCES

"Bleak House" by Charles Dickens, chapter XIV, pp. 96 and 97 of an undated copy.